US010267666B2

(12) United States Patent
Seiler et al.

(10) Patent No.: US 10,267,666 B2
(45) Date of Patent: Apr. 23, 2019

(54) FILL LEVEL MEASUREMENT DEVICE

(71) Applicant: Endress+Hauser GmbH+Co. KG, Maulburg (DE)

(72) Inventors: Christian Seiler, Neuenburg (DE); Patrick Deuber, Siebnen (CH)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 15/543,815

(22) PCT Filed: Dec. 14, 2015

(86) PCT No.: PCT/EP2015/079560
§ 371 (c)(1),
(2) Date: Jul. 14, 2017

(87) PCT Pub. No.: WO2016/113052
PCT Pub. Date: Jul. 21, 2016

(65) Prior Publication Data
US 2017/0370761 A1 Dec. 28, 2017

(30) Foreign Application Priority Data
Jan. 15, 2015 (DE) .................. 10 2015 100 555

(51) Int. Cl.
*G01F 23/28* (2006.01)
*G01F 23/284* (2006.01)
(Continued)

(52) U.S. Cl.
CPC ............ *G01F 23/284* (2013.01); *G01F 23/28* (2013.01); *G01S 7/282* (2013.01); *G01S 7/285* (2013.01);
(Continued)

(58) Field of Classification Search
CPC .......... G01F 23/284; G01F 23/28; G04F 8/02; G04F 5/04; G01S 13/88; G01S 13/10; G01S 7/285; G01S 7/282
(Continued)

(56) References Cited

U.S. PATENT DOCUMENTS

2013/0271158 A1* 10/2013 Thoss ................. G01B 7/14
324/654
2014/0320336 A1* 10/2014 Jales ................. G01S 7/062
342/195

FOREIGN PATENT DOCUMENTS

CN 203177928 U 9/2013
DE 19701884 A1 7/1998
(Continued)

OTHER PUBLICATIONS

Search Report for German Patent Application No. 10 2015 100 555.7, German Patent Office, dated Nov. 26, 2015, 5 pp.
(Continued)

Primary Examiner — Melissa J Koval
Assistant Examiner — Trung Nguyen
(74) Attorney, Agent, or Firm — Mark A. Logan; PatServe

(57) ABSTRACT

The present disclosure relates to a measuring device for measuring a fill level of a material in a container based on time of flight principles, including components that serve to generate, transmit and receive a measurement signal and further serve to convert said measurement signal into an analog intermediate frequency signal having an expected signal frequency within a predetermined frequency range, said intermediate frequency signal including information corresponding to the fill level of the material in the container, wherein an analog to digital converter is provided that serves to subsequently sample the intermediate frequency signal, said analog to digital converter employing a sam-
(Continued)

pling frequency less than the expected signal frequency of intermediate frequency signal.

11 Claims, 2 Drawing Sheets

(51) Int. Cl.
| | |
|---|---|
| *G01S 7/285* | (2006.01) |
| *G01S 13/10* | (2006.01) |
| *G01S 13/88* | (2006.01) |
| *G01S 7/282* | (2006.01) |
| *G04F 5/04* | (2006.01) |
| *G04F 8/02* | (2006.01) |

(52) U.S. Cl.
CPC .............. *G01S 13/10* (2013.01); *G01S 13/88* (2013.01); *G04F 5/04* (2013.01); *G04F 8/02* (2013.01)

(58) Field of Classification Search
USPC ....... 324/600, 654, 658, 686, 661–663, 127, 324/500, 520, 674, 633, 667, 707, 727, 324/34, 104, 115, 118, 135, 175, 195, 324/425, 445, 200, 207.15, 76.11, 76.75; 342/134, 104, 115, 118, 135, 175, 195
See application file for complete search history.

(56) References Cited

FOREIGN PATENT DOCUMENTS

| | | |
|---|---|---|
| DE | 102006006572 A1 | 8/2007 |
| DE | 102008002220 A1 | 12/2009 |
| DE | 102009026885 A1 | 12/2010 |
| EP | 2620754 A1 | 7/2013 |
| EP | 2717068 A1 | 4/2014 |
| WO | 2014036984 A1 | 3/2014 |

OTHER PUBLICATIONS

Search Report for International Patent Application No. PCT/EP2015/079560, WIPO, dated Mar. 22, 2016, 11 pp.
Buchanan, Jr., David C., Performance of an IF sampling ADC in receiver applications, In: 2001 International IC—China Conference & Exhibition: Conference Proceedings: Shanghai, Shanghai Mart, Mar. 26-27, 2001, pp. 63-77.

* cited by examiner

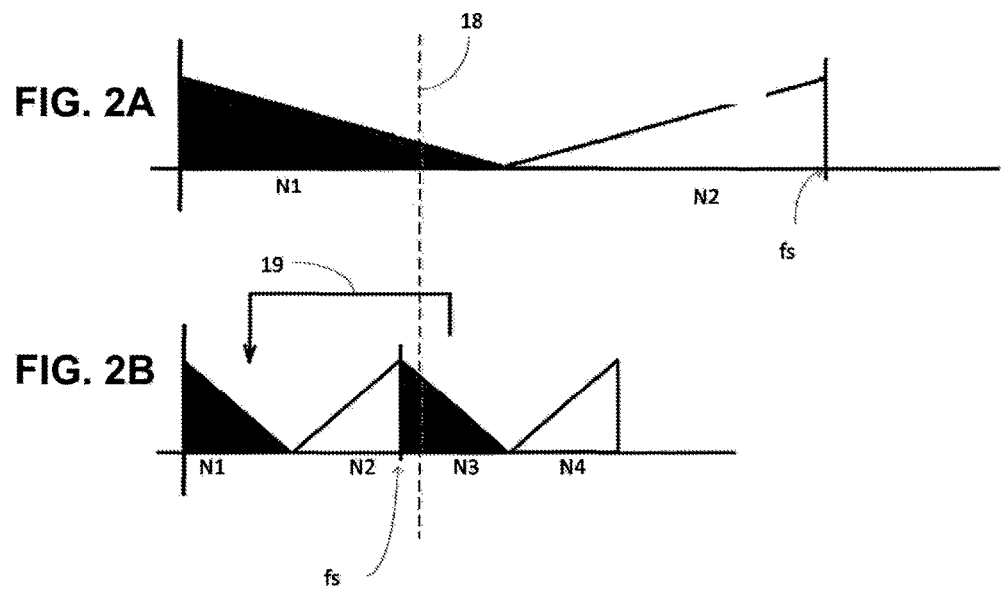
FIG. 2A
FIG. 2B
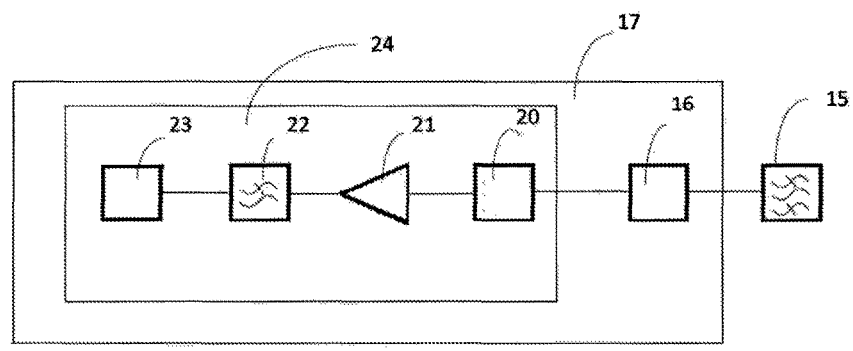
FIG. 3

FILL LEVEL MEASUREMENT DEVICE

CROSS-REFERENCE TO RELATED APPLICATIONS

The present application is related to and claims the priority benefit of German Patent Application No. 10 2015 100 555.7, filed on Jan. 15, 2015 and International Patent Application No. PCT/EP2015/079560, filed on Dec. 14, 2015, the entire contents of which are incorporated herein by reference.

TECHNICAL FIELD

The present disclosure relates to a fill level measuring device for measuring a fill level of a material in a container based on the time of flight principle, the measuring device having components that serve to generate, transmit and receive a measurement signal and further serve to convert said measurement signal into an analog intermediate frequency signal having an expected signal frequency within a predetermined frequency range, said intermediate frequency signal including information corresponding to the fill level of the material in the container.

BACKGROUND

The present disclosure relates to fill level devices that employ ultrasonic and/or electromagnetic measuring signals, such as radar based measuring devices. Such fill level measuring devices are offered by the Endress+Hauser group of companies under the trademarks Prosonic, Micropilot and Levelflex, for example. A fill level measuring device in the sense of the present disclosure is not to be understood as being restricted to a unitary collection of hardware components but can also be a system of spatially separated units. A measurement device can be viewed as having a transducer and a transmitter, wherein the transducer serves to convert a process variable, such as the fill level of a material in a tank, into an electrical signal, and wherein the transmitter serves to sample and process this electrical signal in order to produce a value for the process variable that corresponds to a physical situation that is to be measured. The transmitter, as the case may be, can further serve to transmit and/or save the determined process value for further use. The transducer generally includes a microprocessor and/or microcontroller and various other electrical and electronic circuits. The transducer and the transmitter can be concentrated in a single unitary device, or they can be spatially separated. In the case where they are spatially separated, some sort of communication means, such as a cable or a wireless communication means, is provided. The distinction between transmitter and transducer cannot always be strictly applied, as the transducer in some cases serves to preprocess a measurement signal and sometimes even includes a microprocessor.

Ultrasonic and radar based measuring devices come in a wide variety in terms of measurement accuracy, reliability and cost. These aspects of a fill level measuring device are at least in part determined by the quality and/or characteristics of the components used in the construction of the device. In today's market, fill level measuring devices generally employ narrow-bandwidth band-pass filters to filter out noise components outside of the frequency range of the intermediate frequency signal as well as analog to digital converters for sampling the intermediate frequency signal that have a high sampling rate. A high sampling rate in the sense of the present disclosure is a sampling rate that is at least twice the frequency of the intermediate frequency signal, but can also be much higher. The intermediate frequency signal in the case of an ultrasonic measuring device is to be understood as being the frequency of a signal output by an ultrasonic converter in the ultrasonic measuring device. An application of narrow-bandwidth band-pass filters for an ultrasonic fill level device is described in the German Patent Publication DE00102009026885A1, for example, wherein the trade-off between bandwidth and noise in the selection and application of band-pass filters is described. The analog intermediate frequency signal of an ultrasonic or radar based fill level measuring device generally includes a signal frequency between 0 kHz and 200 kHz, in particular between 10 kHz and 100 kHz.

High speed analog to digital converters and narrow-band band-pass filters, as well as components such as logarithmic amplifiers are generally expensive and have high energy needs. In the German Patent Publication DE102006006572A1, it is suggested that sampling and digitalization of an intermediate frequency signal is possible, in principle, wherein the requirements of the Nyquist-Shannon sampling theorem are not fulfilled in order to save energy as well as to reduce the memory and computational requirements of the a fill level measurement device. This can be implemented so that the difference in time between sampled digital values, said values being alternatingly assigned to one of two groups, is larger than the recipricol of twice the intermediate frequency. The requirement of the Nyquist-Shannon sampling theorem that is no longer met due to this digital sorting of sampled values requires that the sampling rate be at least twice the frequency of the signal that is to be sampled.

SUMMARY

The object of the present disclosure is to disclose a fill level measuring device that makes accurate and reliable measurements while avoiding unnecessary cost and energy requirements.

The object of the present disclosure is achieved with a measuring device for measuring a fill level of a material in a container based on the time of flight principle, the measuring device including components that serve to generate, transmit and receive a measurement signal and further serve to convert said measurement signal into an analog intermediate frequency signal having an expected signal frequency within a predetermined frequency range, said intermediate frequency signal including information corresponding to the fill level of the material in the container, wherein an analog to digital converter is provided that serves to subsequently sample the intermediate frequency signal, said analog to digital converter employing a sampling frequency less than the expected signal frequency of intermediate frequency signal. Components for generating, transmitting and receiving a measurement signal can include, for example, an ultrasound converter and timer electronics in an ultrasound device, or for a radar based fill level measurement device, components such as high frequency oscillators, antenna elements, a signal divider and a mixer, for example. The analog to digital converter can have a sampling rate that is much lower than analog to digital converters that have conventionally been employed. The analog to digital converter can therefore be both cost effective and energy efficient.

Undersampling permits the digitalization of an intermediate signal that is periodic over a predetermined period of time, which is a requirement that the intermediate signal of a fill level measuring device usually fulfills since the rate of change of the fill level in the container is generally negligible in comparison to the rate at which measurement cycles of a fill level measuring device are carried out. When the intermediate frequency is undersampled, a frequency shifted copy or image of the intermediate frequency signal is generated. This image is shifted down from the actual frequency by the sampling frequency. For example, the image of a 60 kHz intermediate frequency signal that is sampled at 50 kHz will have a frequency of 10 kHz. The analog to digital converter is therefore embodied such that it can employ a sampling frequency that is predetermined with respect to an expected frequency of the analog intermediate frequency signal.

In an advantageous embodiment, the analog to digital converter is integrated in a microprocessor of the measurement device. Applying an analog to digital converter that is integrated in a microprocessor provides a relatively inexpensive means of sampling the intermediate frequency in comparison to conventional techniques. Conventionally, the use of an analog to digital converter that is integrated into a microprocessor, such as a 16-bit converter with a 50 kHz sampling frequency, has been avoided due to the fact that only low sampling rates are possible with such converters. However, by combining such an analog to digital converter with an undersampling method, this restriction can be eliminated.

In an embodiment of the disclosed measuring device a band-pass filter is provided that serves to pass the predetermined frequency range and filter frequencies greater than a measurement signal frequency of the measurement signal. In particular, the band-pass filter is embodied to pass the entire predetermined frequency range. A band-pass filter having these features can be a broad-band band-pass filter. High frequency harmonics output by the mixer are hereby filtered out, while at the same time, the entire intermediate frequency signal is passed. A broadband filter of this sort has an advantage over a conventionally used narrow-band band-pass filter that it need not be tuned to the expected frequency of the intermediate frequency signal during production. This reduces the time and complexity required for the construction of fill level measurement devices and further eliminates the need for specialised autotuning features and/or active filtering components. The band-pass filter is selected such that said band pass filter passes a frequency range that includes the intermediate frequency signal independent of a signal form that the intermediate frequency signal takes on and without requiring a manual and/or precise adjustment and/or tuning of the band-pass filter.

In another embodiment, said band-pass filter is embodied to pass a frequency range corresponding to said predetermined frequency range, wherein the frequency range is smaller than half the sampling frequency of said analog to digital converter. Undesired aliasing effects can hereby be excluded from the digitalized intermediate frequency signal.

In an embodiment of the present disclosure, the measuring device is a pulsed radar based fill level measurement device, wherein a local oscillator generates a local oscillator signal in the measuring device, and in that a mixer is provided, which serves to mix a received measurement signal including a sequence of electromagnetic pulses with the local oscillator signal and outputs the analog intermediate frequency signal. In pulsed radar device the pulse repetition frequency of the measuring signal and the local oscillator signal can be predetermined such that the intermediate frequency includes a frequency in a predetermined frequency range. This enables the use of an analog to digital converter that employs a fixed sampling frequency for undersampling.

In a further development of the disclosed measuring device, in the case where the frequency of the intermediate frequency signal corresponds to said expected frequency, the analog to digital converter outputs a digital intermediate frequency signal with a frequency that is shifted down with respect to the frequency of the analog intermediate frequency signal, and in that the magnitude of said frequency shift corresponds essentially to the sampling frequency of the analog to digital converter. The image formed of the intermediate frequency signal in the digital domain can be shifted from a so-called third Nyquist zone to a so-called first Nyquist zone, wherein the Nyquist zones are defined as frequency ranges each having a bandwidth that corresponds to half of the sampling frequency of the analog to digital converter.

In a further development of the disclosed measuring device, a variable amplifier is provided, said variable amplifier being connected between said band-pass filter and said analog to digital converter.

In a further development of the inventive measuring device, a second band-pass filter is connected between said variable amplifier and said analog to digital converter.

In a preferred embodiment of the inventive measuring device, said analog to digital converter is connected directly to said second band-pass filter. A measurement sequence of elements including a mixer, a first band-pass filter, a variable amplifier and a second band-pass filter, together with an analog to digital converter having a low sampling rate, results in a significant reduction in the power requirements of a measuring cycle. This power reduction makes it possible to carry out more measurements for the same energy cost, thereby permitting a high level of accuracy to be achieved at a lower monetary cost, by employing averaging techniques.

In a further development of the disclosed measuring device, the microprocessor includes a component group that serves to perform a decimation process on the digital intermediate frequency signal.

In a further development of the disclosed measuring device, the microprocessor includes a component group that serves to square, low-pass filter and perform a square root function on the digital intermediate frequency signal.

In a further development of the disclosed measuring device, the microprocessor includes a component group that serves to forward-backward filter the digital measurement signal. In this way, a time delay due to filtering can be accounted for.

BRIEF DESCRIPTION OF THE DRAWINGS

The present disclosure will next be more closely described with reference to the following figures.

FIGS. 2A, B show graphical representations of oversampling and undersampling methods for analog to digital conversion of an intermediate frequency signal; and FIG. 3 shows a block diagram illustrating analog and digital signal processing steps.

DETAILED DESCRIPTION

Figure 1:
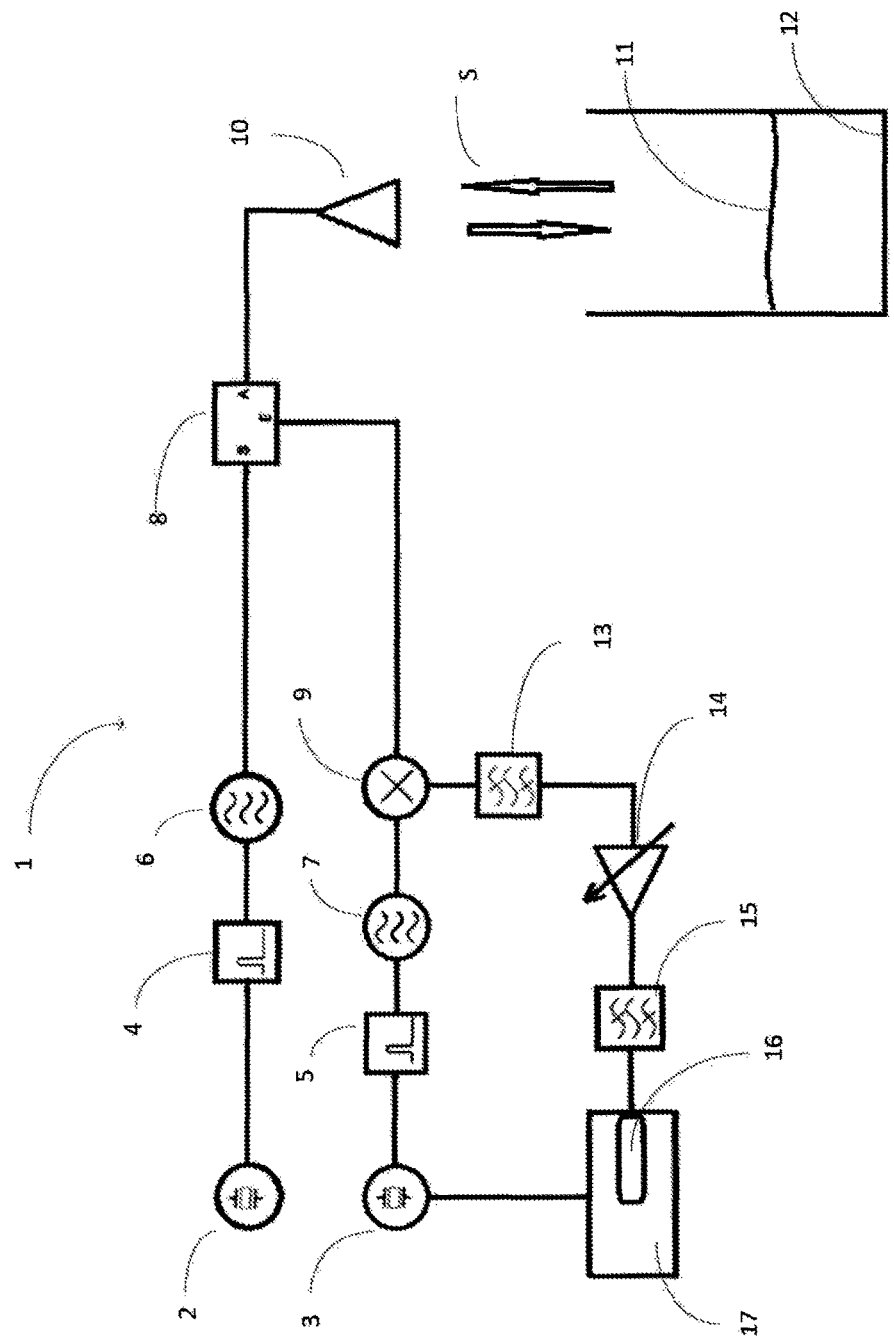
FIG. 1 shows a block diagram of the components of a pulsed radar fill level measurement device.

FIG. 1 shows a block diagram of showing the components of a pulsed radar fill level measurement device 1. Two pulse repetition frequency (hereafter "prf-") generators 2, 3 are shown. The generators can be embodied, for example, as crystal oscillators. The prf-generators 2, 3 in a pulsed radar device generally oscillate in the megahertz range, and have slightly differing frequencies. The prf-generators 2, 3 are each connected to the pulse generators 4, 5, which output pulses having a predetermined pulse width according to the input signals received from the prf-generators 2, 3. The pulse widths are determined by the pulse generators 4, 5 themselves, and are either fixed or could be altered via an analog configuration signal. The repetition frequency of the pulses is determined by the prf-generators 2, 3.

A first pulse generator 4 is connected to a transmit oscillator 6, which serves to modulate a high frequency signal onto each pulse, outputting a high frequency wavepacket. These high frequency wavepackets S, which can also be characterised as the measurement signal S, are fed to a coupler 8, which passes the wavepackets S on to a transmitting-/receiving unit 10. The transmitting/receiving unit 10 can be an antenna, for example, but can also be waveguide, which serves to guide the pulses to a material interface 11 within a container 12. At the material interface 11, regardless of whether the wavepackets S are guided or simply transmitted by an antenna, the wavepackets S encounter a change in impedance and a portion of each wavepacket S is reflected back to the transmitting/receiving unit 10. The reflected portion of the wavepackets, i.e. the reflected portion of the measurement signal S, is fed by the transmitting-receiving unit 10 to the coupler 8. The coupler 8 then passes the measurement signal S to a mixer 9.

At the mixer 9, the measurement signal S is mixed with the so-called local oscillator signal SLO, which includes pulsed, high frequency wavepackets generated by a local oscillator 7. The local oscillator 7 generates this local oscillator signal SLO according to the output of the second pulse generator 5. The output of the mixer 9 is the analog intermediate frequency signal SIF. Generally speaking, the mixer 9 outputs high frequency harmonics in addition to the intermediate frequency signal SIF of interest. These high frequency harmonics are filtered out by a subsequently connected band-pass filter 13. The band-pass filter 13 is a broadband band-pass, such that the entire intermediate frequency signal SIF of interest is passed. The intermediate frequency signal SIF includes an expected frequency, which is determined in large part by the frequency difference between the two prf-generators 2, 3. However, deviations from the expected frequency can occur due to component tolerances and/or temperature effects for example. The band-pass filter 13 is therefore embodied to pass a predetermined frequency band, said predetermined frequency band extending far enough to cover all probable and/or possible frequency variations in the frequency of the intermediate frequency signal SIF. The range of possible frequency variation can be determined from the component tolerances given by component suppliers, for example. Conventionally, a band-pass filter in this position in a pulsed radar device is a narrow-band filter that is "tuned" during production to the actual frequency of the intermediate frequency signal SIF.

The band-pass filtered intermediate frequency signal SIF is then fed to a variable amplifier 14. The variable amplifier 14 can amplify the signal between 0 and 20 dB, for example. This ensures that the analog to digital converter 16 continually samples at an optimal signal strength to maximize the accuracy of the sampling process. In particular, the signal strength of the intermediate frequency signal SIF is set between 16 mVpp and 1.8 Vpp for example, to move the signal above the noise range of the analog to digital converter 16 itself, thereby minimising the noise's effect on the sampling accuracy.

The intermediate frequency signal SIF is then band-pass filtered a second time by a subsequently connected second band-pass filter 15. The second band-pass filter 15 serves to limit the frequency range of the signal that is to be sampled in preparation for undersampling. This second band-pass filtering in particular limits the noise contributions of the various other receiving side components and ensures that the frequency of the intermediate frequency signal SIF is within the third Nyquist zone, as is to be explained in connection with FIGS. 2A, B. The second band-pass filter 15 can be a 4th order filter, for example. The series of components presented in this embodiment eliminates the need to provide a logarithmiser in order to prepare the signal for analog to digital conversion, as is typical in conventional fill level radar devices. This further reduces the power consumption required for a measurement cycle as well as the production cost of the measurement device 1.

The analog to digital converter 16 is a conventional a/d-converter of the sort that is typically included on a microprocessor 17. An example of this type of converter is a simple 16-bit converter that samples at 50 kHz. After the second band-pass filter 14, a typical intermediate frequency signal SIF can include a center frequency of around 60 kHz and a bandwidth of 2 or 3 kHz. According to the Nyquist-Shannon sampling theorem for the conversion of analog signals into the digital domain, the analog signal must be sampled with a sampling frequency that is at least twice the frequency of the analog signal itself. Only then can the information contained in the signal be completely extracted without introducing any indeterminacy. The indeterminacy introduced by undersampling the analog intermediate frequency signal SIF involves the appearance of frequency shifted copies of the sampled signal SIF.

FIG. 2A shows a graphical representation of an oversampling method for analog to digital conversion of an intermediate frequency signal SIF. In FIG. 2A, the first two Nyquist zones N1, N2 are displayed along a frequency axis. The first zone N1 is shaded to indicate the destination Nyquist zone that results from sampling at the sampling frequency fs. The intermediate frequency signal SIF is located in a frequency band surrounding the dashed line 18. The sampling frequency fs here fulfills the requirements of the Nyquist-Shannon sampling theorem. That is, the sampling frequency fs is at least twice the frequency of the analog intermediate frequency signal SIF. As a result, the digital intermediate frequency signal SIF that results from the sampling remains in the first Nyquist zone N1, and there is no indeterminacy introduced.

In FIG. 2B a graphical representation of an undersampling method for analog to digital conversion of an intermediate frequency signal SIF is shown. Here, the intermediate frequency signal SIF is once again contained in a frequency band surrounding the dashed line 18. However, since the sampling frequency fs is much lower, the intermediate frequency signal SIF is in the third Nyquist zone N3. When the analog to digital converter 16 samples the analog signal SIF, an image of the intermediate frequency signal SIF appears in the first Nyquist zone N1 as is indicated by an arrow 19. The indeterminacy introduced by the forming of images or copies of the intermediate frequency signal SIF can be eliminated through digital processing techniques as is described in connection with FIG.

3. In particular, a digital low pass filtering can be carried out, which removes any higher frequency copies of the intermediate frequency signal SIF.

FIG. 3 shows a block diagram illustrating analog and digital signal processing steps. On the analog side, the previously described second band-pass filter 15 receives the intermediate frequency signal SIF and feeds it to the microprocessor 17. The microprocessor 17 includes a standard analog to digital converter 16, which serves to sample the intermediate frequency signal SIF. The analog to digital converter 16 outputs a digital intermediate frequency signal to a digital processing block 24. The digital processing block 24 includes component groups that serve firstly to square 20 the intermediate frequency signal SIF, thereby bringing the entire signal SIF into a positive amplitude range. A second component group 21 then serves to double the signal strength of the squared intermediate frequency signal SIF. Subsequently, the signal SIF can be low pass filtered 22, and then the square root can be taken 23. These digital processing steps lead to the generation of an envelope curve, which can then be evaluated to determine the time of flight of the measurement signal S and/or distance from the transmitting-/receiving unit 10 to the material interface 11. In order to decrease the computational requirements of these digital processing techniques, a signal decimation can additionally be carried out before the digital low-pass filtering 22 is carried out. Furthermore, since the low-pass filtering 22 can lead to an undesired delay in the intermediate frequency signal SIF, a component group can be provided that serves to forward-backward filter the signal SIF, thereby eliminating this delay.

The invention claimed is:

1. A measuring device based on the time of flight principle, comprising:
    components embodied to generate, to transmit and to receive a measurement signal corresponding to a fill level of a material in a container and further embodied to convert the measurement signal into an analog intermediate frequency signal having an expected signal frequency within a predetermined frequency range, the analog intermediate frequency signal including measurement information from the measurement signal; and
    an analog to digital converter configured to sample the analog intermediate frequency signal and to output a digital intermediate frequency signal, wherein the analog to digital converter is further configured to sample at a sampling frequency less than the expected signal frequency of the analog intermediate frequency signal,
    wherein when the frequency of the analog intermediate frequency signal corresponds to said expected frequency, the analog to digital converter outputs a digital intermediate frequency signal with a frequency that is shifted down with respect to the frequency of the analog intermediate frequency signal, and wherein a magnitude of the frequency shift corresponds essentially to the sampling frequency of the analog to digital converter.

2. The measuring device of claim 1, further comprising:
    a microprocessor, wherein the analog to digital converter is integrated in the microprocessor.

3. The measuring device of claim 2, wherein the microprocessor includes a component group configured to perform a decimation process on the digital intermediate frequency signal.

4. The measuring device of claim 2, wherein the microprocessor includes a component group configured to square, to low-pass filter, and to perform a square root on the digital intermediate frequency signal.

5. The measuring device of claim 2, wherein the microprocessor includes a component group configured to forward-backward filter the digital intermediate frequency signal.

6. The measuring device of claim 1, further comprising a band-pass filter configured to pass the predetermined frequency range and to filter frequencies greater than a measurement signal frequency of the measurement signal.

7. The measuring device of claim 6, wherein the band-pass filter is configured to pass a frequency range corresponding to the predetermined frequency range, and wherein the passed frequency range is smaller than half the sampling frequency of the analog to digital converter.

8. The measuring device of claim 6, further comprising a variable amplifier connected between the band-pass filter and the analog to digital converter.

9. The measuring device of claim 8, further comprising a second band-pass filter connected between the variable amplifier and the analog to digital converter.

10. The measuring device of claim 9, wherein the analog to digital converter is connected directly to the second band-pass filter.

11. The measuring device of claim 1, further comprising:
    a local oscillator configured to generate a local oscillator signal in the measuring device; and
    a mixer configured to mix the received measurement signal with the local oscillator signal and to output the analog intermediate frequency signal, wherein the measuring device is a pulsed radar based device and wherein the received measurement signal includes a sequence of electromagnetic pulses.

* * * * *